T. J. McGARRY.

Vessels for Storing and Transporting Oils.

No. 8,071. Reissued Feb. 5, 1878.

WITNESSES.

E. W. Gross.

Geo. H. Kerner

INVENTOR.

Thomas J. McGarry

Per Burridge & Co

Attys

UNITED STATES PATENT OFFICE.

THOMAS J. McGARRY, OF CLEVELAND, OHIO.

IMPROVEMENT IN VESSELS FOR STORING AND TRANSPORTING OILS.

Specification forming part of Letters Patent No. 64,123, dated April 23, 1867; Reissue No. 8,071, dated February 5, 1878; application filed December 27, 1875.

*To all whom it may concern:*

Be it known that I, THOMAS J. McGARRY, of Cleveland, in the county of Cuyahoga and State of Ohio, have invented certain new and useful Improvements in Oil-Tanks; and I do hereby declare that the following is a full, clear, and complete description of the same, reference being had to the accompanying drawings, making a part of this specification, in which—

Figure 1:
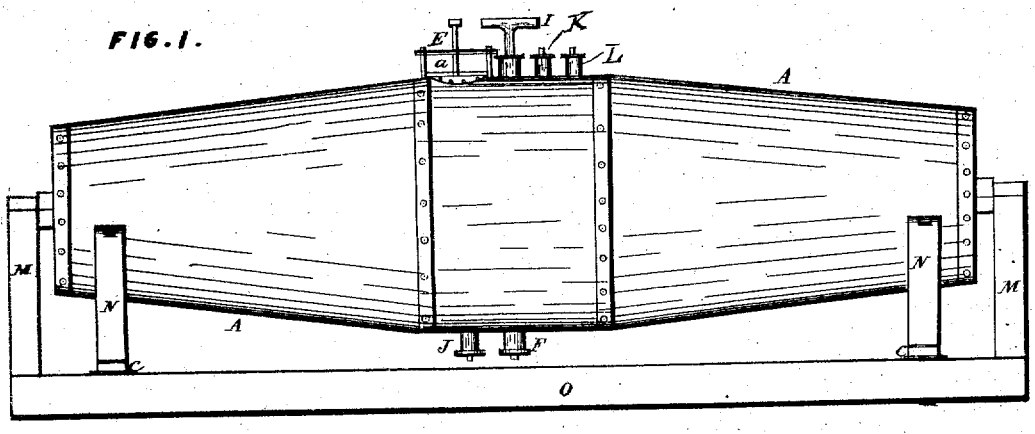
Figure 2:
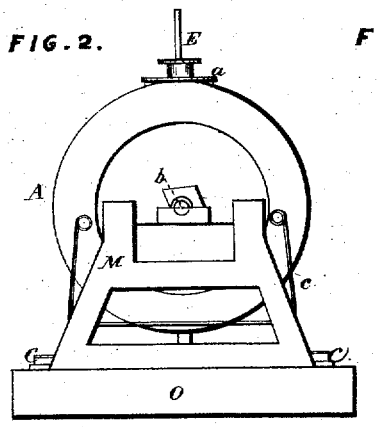
Figure 3:
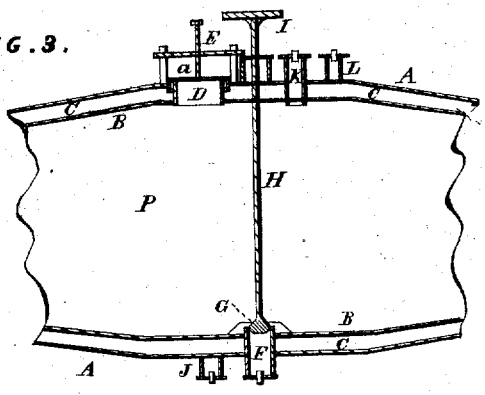

Figure 1 is a side view of the tank A and its appurtenances in part. Fig. 2 is an end view of the same. Fig. 3 is a detached longitudinal vertical section of the tank A and of the inner shell or lining B, and also shows parts of the appurtenances connected with the tank and lining.

Like letters of reference refer to like parts in the several views.

This tank consists of a cylindrical or barrel shaped vessel, (seen at A, Fig. 1,) which is constructed of iron, and of a holding capacity greater or less, as may be required. Within the tank A is secured the inner shell or lining B, Fig. 3, and this, in conjunction with a head at each end of said lining B and at each end of said tank A, forms the annular chamber C, Fig. 3. D, Fig. 3, is a man-hole, and is provided with a plate, *a*, around the under side of which is a deep flange, which is made to fit into a corresponding groove surrounding the man-hole. This plate is made tight, and kept in place by the screw E, Figs. 1 and 3. At the under side of the tank is the outlet F, Figs. 1 and 3, leading from the interior of the shell B, and which is closed by the valve G, Fig. 3. This valve is operated by the rod H, Fig. 3, which is seen to project through the upper side of the tank A, and terminates in the handle I, Figs. 1 and 3. J, Figs. 1 and 2, is also an outlet, leading from the water-chamber C, Fig. 3. At the upper side is the inlet K, Figs. 1 and 3, leading to the interior of the lining B. L, Figs. 1 and 3, is an inlet, leading to the water-chamber C. These inlets and outlets are closed by screw-caps, by means of which they are kept tight and secure. Each end of this tank A is provided with a journal, *b*, by which it is sustained upon supports or trusses M, Figs. 1 and 2, and made to revolve, for the purpose hereinafter shown.

To aid in the support of the tank A, a pair of saddles, N, Figs. 1 and 2, are provided, and upon which the ends of the tank are supported, as shown in Figs. 1 and 2. O, Figs. 1 and 2, represents the platform of a railroad car or truck, upon which the tank is mounted, and supported upon said trusses and saddles secured to the platform of the car or truck. Under the feet of the saddles N, Figs. 1 and 2, is placed a spring, *c*, for the purpose of an easier carriage of the filled tank A, the transportation of which may be by land or water.

The interior chamber P of the lining is filled with oil through the inlet K, Figs. 1 and 3, and then the inlet is closed by the screw cap, as before described. The annular chamber C is filled with water through the inlet L, Figs. 1 and 3, and when so filled the inlet is closed by the screw-cap.

By this arrangement of lining B the oil is entirely surrounded by water, and is therefore completely protected. Hence the danger of taking fire while in transportation or otherwise is wholly avoided, as no part of the tank A is then in contact with the oil; also, the water prevents any leakage of the oil to the outside.

In order to draw the oil from the chamber P, a tube or conductor is attached to the outlet F, Figs. 1 and 2. For the greater convenience of attaching the conductor, or for other needful purposes, the tank may be turned upon the journals referred to. The oil is then drawn off by raising the valve G, Fig. 3, by means of a thread cut upon the rod H, Fig. 3, and in the stuffing-box, through which the rod is projected, as aforesaid.

As before remarked, this tank A is shown as being mounted upon a platform of a railroad car or truck, supported on trusses and saddles, as above said. In this position it is easily and conveniently transported, and without danger of displacement.

In order to transport the tank and its appurtenances by steamboat or vessel, or other such conveyance, it is taken from the trusses, and stowed away in the hold in the same manner as ordinary barrels, and will occupy no more room than a cask of equal capacity, and is far safer and more durable.

What I claim as my invention, and desire to secure by Letters Patent, is—

1. In vessels for storing and transporting oils, the tank A and the shell or lining B, forming a water-chamber at the sides and ends, in combination with inlets and outlets, arranged as and for the purpose substantially as set forth.

2. The tank for transportation supported upon journals or bearings, as and for the purpose set forth.

3. The saddles N, provided with spring-bearings, in combination with the tank, substantially as and for the purpose set forth.

4. In combination with the oil-tank A of a railway-car, the saddles N, substantially as and for the purpose set forth.

THOMAS J. McGARRY.

Witnesses:

PETER THATCHER,

E. W. CROSS.